Patented Dec. 13, 1932

1,891,057

UNITED STATES PATENT OFFICE

CURT SCHUMANN, EDUARD MUENCH, AND BRUNO CHRIST, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF INDOLE AND DERIVATIVES THEREOF

No Drawing. Application filed May 21, 1929, Serial No. 364,933, and in Germany May 26, 1928.

The present invention relates to the production of dihydroindoxyls, acyl derivatives thereof and indoles by hydrogenation of indoxyls and acyl derivatives thereof and splitting off water from the hydrogenation products.

We have found that well characterized reduction products, namely dihydroindoxyls and dihydroindoles, are obtained by the treatment of indoxyl, its homologues, or analogues thereof which term is meant to define naphthindoxyls, or their —N—, O—, or N—O— acyl compounds, with hydrogen or gases containing hydrogen in the presence of hydrogenation catalysts. The two classes of reduced products are frequently obtained simultaneously. The reduction can be carried out, however, in such a manner that one or the other class of reduction products is obtained almost exclusively.

The dihydroindoxyls are produced preeminently when the reduction is carried out under the mildest possible conditions, in which the splitting off of water within the molecule cannot occur, for example by carrying out the reduction at about room temperature with or without the employment of pressure.

A particularly advantageous method for the reduction of indoxyl consists in beginning the hydrogenation preferably with elevated pressure, at low temperatures, for example 15° C., and in gradually raising the temperature to from 25° to 35° during the course of several hours. After the end of the hydrogenation the hitherto unknown 2.3-dihydroindoxyl is present in the reaction mixture. This can be isolated, for example by extracting the reaction solution several times with ether. It is obtained by a single crystallization from a mixture of benzene and ligroine with the addition of animal charcoal in the form of needles having a melting point of from 92° to 93° C. It can be converted into N-acetyl-2.3-dihydroindoxyl by means of acetic acid anhydride. By carrying out the reduction at more elevated temperatures, for example at 80° C. dihydroindoxyls can also be obtained, but in this case it is preferable that the pressure should not exceed, or not exceed to any considerable extent, atmospheric pressure. In some cases dihydroindoxyls are obtained at higher temperatures and under elevated pressure, by working in the absence of substances which promote the splitting off of water, and by interrupting the reaction at the right time, that is when 2 atoms of hydrogen have been taken up.

On the other hand, dihydroindoles are obtained when the conditions are favorable for the splitting off of water within the molecule, for example when working at elevated temperatures and preferably at elevated pressures, and if desired with the simultaneous employment of substances which promote the splitting off of the water. For the production of dihydroindoles it is frequently suitable to raise the temperature to 80° C. when the greater part of the indoxyl has already been hydrogenated into dihydroindoxyl. It is frequently desirable to raise the temperature even above 80° C., since otherwise mixtures of dihydroindoles with the corresponding indoles are obtained, because the greater part of the dihydroindoxyls formed have already been converted into the indoles by the splitting off of water within the molecule and the further hydrogenation into dihydroindoles only commences at more elevated temperatures.

The reduction of the indoxyls, homologues and analogues thereof, and of the —N—, O—, or N—O— acyl compounds of these substances, such as N-acetylindoxyl, N.O-diacetylindoxyl, N-acetyl- and N.O-diacetylmethylindoxyl, and N.O-diacetylnaphthindoxyl, is preferably carried out in the presence of diluents or solvents, such as water, alcohol, acetic acid, ethyl acetate, or decahydronaphthalene, with or without the addition of basic substances or of salts, for example of organic bases, caustic alkalies, phosphates, bicarbonates, carbonates, acetates, borates and the like. The employment of salts is advantageous in the reduction of N.O-diacylindoxyls, since the separation of the O-acyl residues is facilitated thereby. For the hydrogenation of indoxyls aqueous solutions of salts, the hydrogen ion concentrations of which lie about between pH values of 7 and 9.5, are particularly suitable. The indoxyls can, however, also be hydrogenated beyond the said values with the production of good yields.

Generally speaking any hydrogenation catalysts can be employed as the catalysts for the purpose of the present invention, in particular those which contain metals of the first or eighth group of the periodic system as the catalytically acting constituents. The hydrogenation catalysts may consist of the single metals or metal compounds or of mixtures of the same, mixed catalysts for example such as nickel and copper, copper and cobalt, nickel copper and cobalt catalysts are particularly suitable. The catalysts may contain the metals and the like distributed on carriers, such as kieselguhr, fuller's earth, hydrated aluminium oxides and the like and in the presence or absence of other, in particular activating, metals of various groups of the periodic system or their compounds.

When employing catalysts containing the "noble" metals, such for example as platinum, the reduction can be carried out in media having acid reaction, for example in acetic acid.

The dihydroindoxyls and dihydroindoles obtained can be employed as intermediates for the manufacture of dyestuffs, perfumes, vulcanization accelerators and the like.

The splitting off of water within the molecule of the 2.3-dihydroindoxyls already described can be readily effected and indoles are thus obtained. Indoles can also be obtained by the splitting off of water and the saponification of N-acyl-dihydroindoxyls.

The splitting off of water occurs very readily by treatment with mineral acids, for example it may be carried out by weakly acidifying an aqueous solution of the dihydroindoxyl with sulphuric acid and by then distilling the mixture with steam. The dihydroindoxyl is thus converted directly into the corresponding indole. Stronger acids, for example sulphuric acid of 40° Baumé, cause the splitting off of water already in the cold. Moreover, organic acids and aqueous solutions of a great variety of salts facilitate the splitting off of water. In many cases the splitting off of water can be caused by simply raising the temperature; however, it is necessary to heat for a longer period of time. In many cases it is not necessary to isolate the dihydroindoxyls from the reaction solution obtained by the hydrogenation of the indoxyls in order to prepare the indoles. Generally speaking, it suffices to make the aqueous solution containing the dihydroindoxyls weakly acid with mineral acid. Then by distillation with steam the corresponding indoles are obtained directly. Moreover, alkalies, or salts having an alkaline reaction, either as such, or in the dissolved state, render the splitting off of water feasible, and in the case of N-acyldihydroindoxyls, by causing a sufficiently vigorous reaction, a simultaneous saponification to the corresponding indole occurs. By carrying out the treatment with the agent for splitting off water with the simultaneous passing in of steam, when employing acids, the N-acylindoles, and when employing alkalies the indoles, are almost exclusively carried over. The N-acylindoles obtained are converted into the free indoles by saponification, preferably by means of substances having an alkaline reaction. The reactions can also be carried out under pressure.

The N-acylindoles and the indoles obtained in accordance with the present invention can be employed for a great variety of purposes, for example as perfumes for pharmaceutical purposes, or as intermediates in the dyestuff industry.

The following examples will further illustrate the nature of the said invention, but the invention is not restricted to these examples. The parts are by weight.

*Example 1*

A mixture of 5 parts of indoxyl, 10 parts of a nickel copper kieselguhr catalyst which contains 22.5 parts of nickel and 2.5 parts of copper in each 100 parts, and 20 parts of borax together with 175 parts of water, having a temperature of from 10 to 15° C. is heated from 15° to 35° C. in an autoclave fitted with a shaking device during 4 hours while shaking under a pressure of hydrogen of 100 atmospheres. After releasing the pressure and filtering off the catalyst by suction and washing the same several times with water at room temperature, any unchanged indoxyl still present in the filtrate is oxidized at first by air at ordinary temperature and the indigo thus formed is then filtered off by suction. The dihydroindoxyl can then be recovered from the indigo filtrate by extraction with ether. After drying the ethereal solution over potassium carbonate and distilling off the ether a crude product is obtained which by a single crystallization from a mixture of benzene and ligroine with the addition of animal charcoal is obtained in a pure state in which it has a melting point of from 92° to 93° C. It corresponds to the formula:

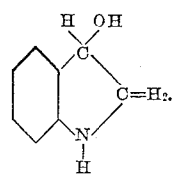

The indigo filtrate can also be evaporated in vacuo and the dihydroindoxyl can then be extracted from the residue with organic solvents. The dihydroindoxyl can be converted into N-acetyldihydroindoxyl by means of acetic acid anhydride.

Example 2

An autoclave fitted with a shaking device is charged with 8 parts of indoxyl, 10 parts of a copper cobalt kieselguhr catalyst which contains 12.5 parts of copper and 12.5 parts of cobalt in each 100 parts, 20 parts of sodium bicarbonate and 175 parts of ice-cold water. Hydrogen is then forced in until the pressure is about 100 atmospheres and the mixture is then slowly heated during 12 hours to 26° C. while shaking. The mixture is then shaken for another 30 hours at 26° C. The hydrogen pressure is then released, the catalyst filtered off by suction and washed several times with cold water. The filtrate is worked up in the manner described in Example 1. Dihydroindoxyl is obtained in a practically quantitative yield.

Example 3

A mixture of 6.5 parts of indoxyl, 10 parts of a nickel copper kieselguhr catalyst, 20 parts of sodium bicarbonate and 175 parts of ice water is heated in a shaking autoclave during 14 hours to 25° C. under a hydrogen pressure of 140 atmospheres while shaking, the temperature is then raised during one hour to from 95° to 100° C. and the whole shaken for another two hours at this temperature. After cooling to room temperature the pressure is released and the catalyst separated and washed with warm alcohol. The filtrate is made acid to Congo-red with sulphuric acid of 20° Baumé and any indole present is separated by distillation with steam. The residue from the steam distillation is then treated with a slight excess of caustic soda solution of 40° Baumé and the dihydroindole present is then separated by distillation with steam. After extracting the distillate with ether, drying and distilling off the ether, the dihydroindole corresponding to the formula:

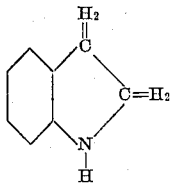

remains as an oil, which is converted into N-acetyl-2.3-dihydroindole by treatment with acetic acid anhydride.

Example 4

A mixture of 5 parts of N.O-diacetylindoxyl corresponding to the formula:

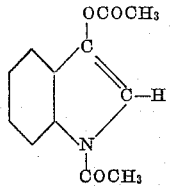

obtainable according to German Patent No. 113,240, 10 parts of a nickel kieselguhr catalyst, 20 parts of sodium bicarbonate and 250 parts of water is shaken with hydrogen at from 80° to 85° C. under an excess pressure of from 30 to 50 centimeters (water column). After about 2 hours the absorption of hydrogen is complete. By evaporation of the reaction mixture in vacuo, extraction of the residue with acetone and distilling off of the acetone, over 75 per cent of the theoretical yield of crude N-acetyldihydroindoxyl is obtained, and this can be obtained in a pure state by a single crystallization from toluene with the addition of animal charcoal. This substance has a melting point of 158° C. (corrected), forms colorless leaflets, and is slightly soluble in cold water, fairly readily soluble in hot water, and readily soluble in warm alcohol and acetone.

Example 5

A mixture of 10 parts of N.O-diacetylindoxyl, 10 parts of a 25 per cent nickel kieselguhr catalyst, 100 parts of water and 100 parts of a normal solution of caustic soda is shaken under a hydrogen pressure of about 100 atmospheres at from 25° to 35° C. for several hours in an autoclave fitted with a shaking device. The sodium hydroxide present is then converted with carbon dioxide into sodium bicarbonate and the whole worked up as in Example 4. The mixture which has been treated with carbon dioxide may also be filtered off from the catalyst which is extracted several times with hot water and the aqueous extracts united with the filtrate, concentrated by evaporation in vacuo and then extracted with organic solvents. 7.5 parts of N-acetyldihydroindoxyl are obtained; this corresponds to 91.8 per cent of the theoretical yield.

Example 6

10 parts of N-monoacetylindoxyl, 10 parts of a 25 per cent nickel kieselguhr catalyst and 175 parts of 50 per cent aqueous ethyl alcohol are shaken for about 6 hours at from 25° to 35° C. under a hydrogen pressure of 100 atmospheres in a shaking autoclave. After releasing the pressure of hydrogen the temperature is raised to 80° C., the solution separated from the catlyst and the latter extracted with 100 parts of hot 50 per cent aqueous ethyl alcohol and filtered. The united filtrates yield 8.7 parts of practically pure N-acetyldihydroindoxyl by concentration in vacuo; this corresponds to 86 per cent of the theoretical yield.

Example 7

A shaking bomb is charged with 20 parts of N.O-diacetylindoxyl, 15 parts of a nickel kieselguhr catalyst, 20 parts of sodium bicarbonate and 175 parts of water, and hydrogen is forced in until the pressure is 100 atmospheres and the mixture is then shaken at from 80° to 90° C. for about 110 hours. The mixture is evaporated in vacuo and the dry residue extracted with ether in a Soxhlet apparatus. After distilling off the ether, 14.4 parts of residue are obtained, 90 per cent of which consists of acetyldihydroindole. After a single crystallization from ligroine the product has a melting point of 105° C. (corrected). The remaining 10 per cent of the crude reaction product consists chiefly of N-acetyldihydroindoxyl which is only soluble with difficulty in ligroine and therefore can be separated from the N-acetyldihydroindole.

A similar result is obtained by employing a nickel tungsten catalyst instead of the nickel kieselguhr catalyst.

Example 8

A mixture of 5 parts of N-acetyldihydroindoxyl, 10 parts of a nickel kieselguhr catalyst and 175 parts of water is shaken with hydrogen under a pressure of 80 atmospheres at from 95° to 100° C. for about 12 hours. The reaction product evaporated in vacuo yields 90 per cent of the theoretical quantity of N-acetyldihydroindole when extracted with ether.

Example 9

A solution of 10 parts of 2.3-dihydroindoxyl in 500 parts of water is weakly acidified with dilute sulphuric acid and then distilled with steam as quickly as possible. By making the distillate weakly alkaline by means of caustic soda, extracting with ether, drying over potassium carbonate and distilling off the ether, indole is obtained in a quantitative yield.

Example 10

A mixture of 8 parts of indoxyl, 10 parts of a copper cobalt kieselguhr catalyst which contains 12.5 parts of copper and 12.5 parts of cobalt in each 100 parts, 20 parts of sodium bicarbonate and 175 parts of ice-cold water is shaken in a shaking autoclave with hydrogen under a pressure of 100 atmospheres, while heating to 25° C. during 8 hours, then for another 8 hours at 25° C., and after quickly raising the temperature to 80° C. the whole is then shaken for 2 hours at 80° C. In this manner the conversion of the dihydroindoxyl first formed into indole, by the splitting off of water occurs. By partial hydrogenation some dihydroindole is formed. After cooling to room temperature the pressure of hydrogen is released, the catalyst separated and washed several times with warm alcohol. By cooling in ice, indole crystallizes out from the filtrate and can be separated. The solution is then made acid to Congored, with dilute sulphuric acid, and any indole still present is separated by distillation with steam. The total quantity of crude indole obtained amounts to 5.8 parts which is 82.5 per cent of the theoretical yield. It can be obtained in a pure state by a single crystallization from ligroine with the addition of animal charcoal. The residue from the steam distillation contains small quantities of dihydroindole.

Example 11

10 parts of N-acetyldihydroindoxyl are dissolved in 250 parts of hot water, and 1 part of a normal solution of sulphuric acid is added and the mixture distilled with steam until no more N-acetylindole passes over. The distillate is saturated with common salt and the N-acetylindole is extracted with ether. The ether extract is dried with sodium sulphate and the ether distilled off; a residue of N-acetylindole in a yield of over 90 per cent of the theory is left behind.

Example 12

5 parts of N-acetylindole obtainable according to Example 11 are boiled with 70 parts of a semi-normal solution of caustic soda for one hour under a reflux condenser. After cooling the reaction mixture in ice 3.45 parts of indole having a melting point of from 50° to 51° C. crystallize out.

The same product can be obtained by treating the distillate from the steam distillation, obtainable as described in Example 11, with caustic soda, boiling, and then distilling off the indole, which is quantitatively formed, with steam. In this manner the indole is obtained in a state of great purity.

Example 13

10 parts of acetyldihydroindoxyl, 70 parts of a normal solution of caustic soda and 280 parts of water are heated in an autoclave at 150° C. for 8 hours. Part of the indole formed crystallizes out by cooling the reaction mixture in ice. The remainder can be recovered by extracting the solution with ether.

Example 14 o-toluylglycine is fused with caustic soda and the melt dissolved in cold water saturated with carbon dioxide in a vessel provided with a liquid seal. 7-methyl-indoxyl is precipitated by means of carbon dioxide from the said solution and filtered by suction. The filter cake containing sodium bicarbonate besides 7-methyl-indoxyl is immediately treated with acetic anhydride and 7-methyl-N.O-diacetylindoxyl melting at about 118° to 120° C. obtained. 5 parts of the said diacetylindoxyl, 3 parts of calcium hydroxide, 175 parts of water and 10 parts of a nickel kieselguhr catalyst containing 25 per cent of nickel are introduced into a shaking autoclave into which hydrogen is forced in until the pressure is 100 atmospheres, the mixture being then shaken for 3 hours at between 30° and 40° C. The reaction mixture is then separated by filtration from the catalyst which is twice washed with warm ethyl alcohol. 7-methylindole is obtained from the slightly acidified filtrate by distillation with steam. After a single recrystallization with the addition of animal charcoal pure 7-methylindole of a melting point of from 84° to 85° C. is obtained. In the said manner 7-methylindole is produced from 7-methyldiacetylindoxyl by hydrogenation and simultaneous splitting off of water and saponification of both acetyl groups.

What we claim is:

1. A process of producing compounds of the indole series which comprises acting on a compound selected from the group consisting of indoxyl, naphthindoxyl, their homologues, -N-acyl and (-N-acyl, -O-acyl) compounds, with a gas containing hydrogen in the presence of a hydrogenation catalyst.

2. A process of producing compounds of the indole series, which comprises acting on a compound selected from the group consisting of indoxyl, naphthindoxyl, their homologues, -N-acyl and (-N-acyl, -O-acyl) compounds, with a gas containing hydrogen in the presence of an inert diluent and a hydrogenation catalyst.

3. A process of producing compounds of the indole series, which comprises hydrogenating a compound selected from the group consisting of indoxyl, naphthindoxyl, their homologues, -N-acyl and (-N-acyl, -O-acyl) compounds, by means of a gas containing hydrogen in the presence of a hydrogenation cataylst and splitting off water from the hydrogenation product.

4. A process of producing acyl compounds of the indole series, which comprises acting on a compound selected from the group consisting of -N-acyl and (-N-acyl, -O-acyl) compounds of indoxyl, naphthindoxyl and their homologues, with a gas containing hydrogen in the presence of a hydrogenation catalyst.

5. A process of producing acyl compounds of the indole series, which comprises hydro-on a compound selected from the group consisting of -N-acyl and (-N-acyl, -O-acyl) compounds of indoxyl, naphthindoxyl and their homologues, with a gas containing hydrogen in the presence of an inert diluent and a hydrogenation catalyst.

6. A process of producing acyl compounds of the indole series, which comprises hydrogenating a compound selected from the group consisting of -N-acyl and (-N-acyl, -O-acyl) compounds of indoxyl, naphthindoxyl and their homologues, by means of a gas containing hydrogen in the presence of a hydrogenation catalyst and splitting off water from the hydrogenation product.

7. A process of producing compounds of the indole series which comprises acting on a compound selected from the group consisting of -N-acyl and (-N-acyl, -O-acyl) compounds of indoxyl, naphthindoxyl and their homologues, with a gas containing hydrogen in the presence of a hydrogenation catalyst and saponifying the hydrogenation product.

8. A process of producing compounds of the indole series, which comprises hydrogenating a compound selected from the group consisting of -N-acyl and (-N-acyl, -O-acyl) compounds of indoxyl, naphthindoxyl and their homologues, by means of a gas containing hydrogen in the presence of a hydrogenation catalyst, splitting off water from the hydrogenation product and then saponifying the resulting product.

9. A process of producing compounds of the indole series, which comprises hydrogenating a compound selected from the group consisting of indoxyl, naphthindoxyl, their homologues, -N-acyl and (-N-acyl, -O-acyl) compounds, by means of a gas containing hydrogen in the presence of a hydrogenation catalyst, splitting off water from the hydrogenation product and further hydrogenating the resulting product, the process being carried out in a single operation.

10. A process of producing compounds of the indole series, which comprises hydrogenating a compound selected from the group consisting of -N-acyl and (-N-acyl, -O-acyl) compounds of indoxyl, naphthindoxyl and their homologues, by means of a gas containing hydrogen in the presence of a hydrogenation catalyst, splitting off water from the hydrogenation product and further hydrogenating the resulting product, the process being carried out in a single operation.

11. As new articles of manufacture dihydroindoxyls corresponding to the general formula:

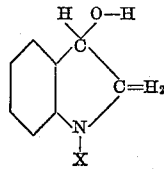

in which X stands for hydrogen or an acyl group, the said compounds being converted into the corresponding indoles by splitting off water from the molecule.

12. As a new article of manufacture N- acetyldihydroindoxyl corresponding to the formula:
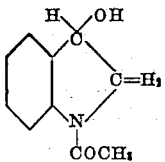
which crystallizes from a mixture of benzene and ligroine and melts at about from 92° to 93° C.
In testimony whereof we have hereunto set our hands.
CURT SCHUMANN.
EDUARD MUENCH.
BRUNO CHRIST.

CERTIFICATE OF CORRECTION.

Patent No. 1,891,057. December 13, 1932.

CURT SCHUMANN, ET AL.

It is hereby certified that error appears in the printed specification of the above numbered patent requiring correction as follows: Page 5, line 2, of claim 5, for "hydro-" read "acting"; and that the said Letters Patent should be read with this correction therein that the same may conform to the record of the case in the Patent Office.

Signed and sealed this 9th day of May, A. D. 1933.

M. J. Moore.

(Seal) Acting Commissioner of Patents.